United States Patent
Bone, Jr.

(10) Patent No.: US 7,459,053 B2
(45) Date of Patent: Dec. 2, 2008

(54) FLUX GUIDE INDUCTION HEATING DEVICE AND METHOD OF INDUCTIVELY HEATING ELONGATED AND NONUNIFORM WORKPIECES

(76) Inventor: Marvin J. Bone, Jr., 5605 Independence St., Arvada, CO (US) 80002

( * ) Notice: Subject to any disclaimer, the term of this patent is extended or adjusted under 35 U.S.C. 154(b) by 509 days.

(21) Appl. No.: 11/254,483

(22) Filed: Oct. 20, 2005

(65) Prior Publication Data

US 2006/0255029 A1 Nov. 16, 2006

Related U.S. Application Data

(63) Continuation-in-part of application No. 11/126,714, filed on May 11, 2005, now abandoned.

(51) Int. Cl.
*B29C 65/00* (2006.01)
(52) U.S. Cl. .................. 156/272.2; 219/600
(58) Field of Classification Search .......... 156/272.2, 156/272.4, 296; 219/600, 603, 605, 607, 219/636, 637, 639, 643
See application file for complete search history.

(56) References Cited

U.S. PATENT DOCUMENTS

| | | | |
|---|---|---|---|
| 458,163 A | 8/1891 | Gutmann | |
| RE13,154 E | 10/1910 | Gin | |
| 1,201,929 A * | 10/1916 | Bolus | 219/55 |
| 1,234,280 A | 7/1917 | Burnett et al. | |
| 1,725,465 A | 8/1929 | Manson | |
| 2,024,906 A | 12/1935 | Bennett | |
| 2,501,393 A | 3/1950 | Kendall | |
| 2,647,982 A | 8/1953 | Baker | |
| 2,862,092 A | 11/1958 | Cowan | |
| 3,187,155 A | 6/1965 | Beckert et al. | |
| 3,467,806 A | 9/1969 | Dixon | |
| 3,965,321 A | 6/1976 | Brinkmann et al. | |
| 4,311,896 A | 1/1982 | Junya | |
| 4,521,659 A | 6/1985 | Buckley et al. | |
| 4,619,127 A | 10/1986 | Sano et al. | |
| 4,740,663 A * | 4/1988 | Roth et al. | 219/660 |
| 4,798,926 A | 1/1989 | Sakai | |
| 4,937,419 A | 6/1990 | Kolodziej et al. | |
| 4,950,348 A | 8/1990 | Larsen | |
| 5,023,419 A | 6/1991 | Langstedt | |
| 5,025,124 A | 6/1991 | Alfredeen | |
| 5,099,756 A | 3/1992 | Franconi et al. | |
| 5,248,865 A | 9/1993 | Tyler | |
| 5,349,165 A * | 9/1994 | Doljack | 219/633 |
| 5,350,902 A | 9/1994 | Fox et al. | |
| 5,365,041 A | 11/1994 | Shank | |
| 5,412,183 A * | 5/1995 | Buffenoir et al. | 219/637 |
| 5,442,159 A | 8/1995 | Shank | |
| 6,365,883 B1 | 4/2002 | Pohl | |
| 2003/0226631 A1* | 12/2003 | Sterud et al. | 156/64 |

* cited by examiner

OTHER PUBLICATIONS

Brochure for Robotron Corporation, "Induction Bonding: A Process for the Accelerated Cure of Structural Adhesives."

*Primary Examiner*—John L Goff
*Assistant Examiner*—Daniel McNally
(74) *Attorney, Agent, or Firm*—John R. Ley

(57) ABSTRACT

An elongated workpiece is inductively heated by a difference in an amount of magnetic flux flowing in a portion of the elongated workpiece compared to an amount of magnetic flux around the same portion of the elongated workpiece. The flux differential induces circumferential eddy currents to heat that portion of the workpiece. The alternating magnetic flux is conducted to the workpiece in a high permeability flux guide.

13 Claims, 5 Drawing Sheets

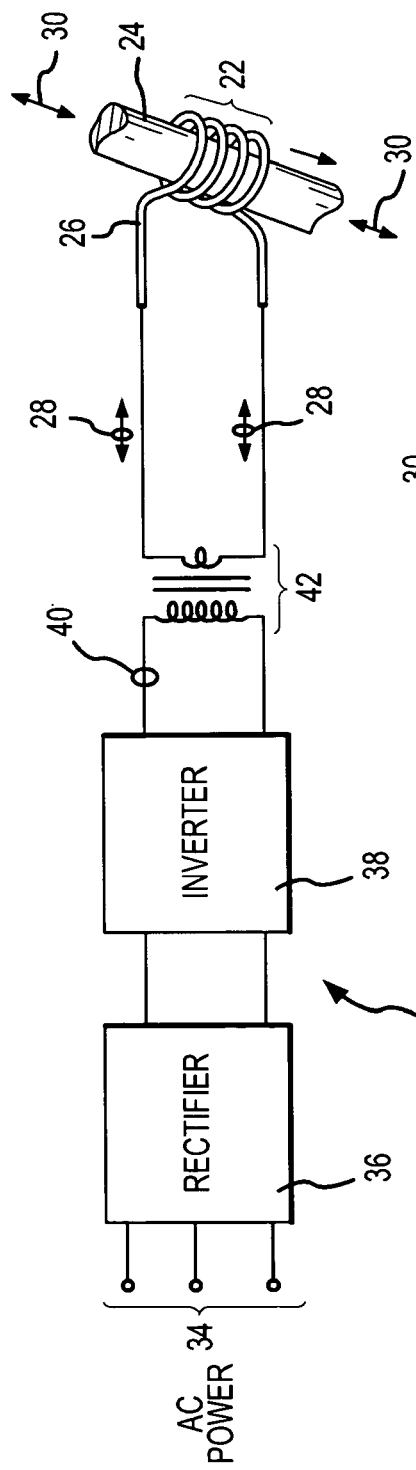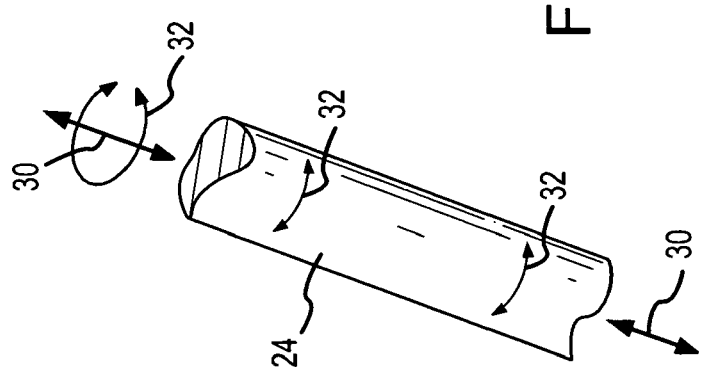
FIG. 1
PRIOR ART
FIG. 2

FLUX GUIDE INDUCTION HEATING DEVICE AND METHOD OF INDUCTIVELY HEATING ELONGATED AND NONUNIFORM WORKPIECES

CROSS REFERENCE AT RELATED APPLICATION

This is a continuation in part of U.S. patent application Ser. No. 11/126,714, filed May 11, 2005, now abandoned, for an invention for a Flux Guide Induction Heating Method of Curing Adhesive to Bond Sheet Pieces Together.

FIELD OF THE INVENTION

This invention relates to heating an object or a workpiece made of electrically conductive material. More particularly, the invention relates to a new and improved induction heating device and method for efficiently and effectively heating an elongated or nonuniformly shaped workpiece by using a flux guide to conduct the magnetic flux to the workpiece to induce circumferential heating.

BACKGROUND OF THE INVENTION

Many types of commercial and industrial objects require heat treatment when they are manufactured. For example, certain objects require surface hardening. Surface hardening is achieved by heating the object and then quickly reducing or quenching its temperature. Other objects must be annealed, which is achieved by heating the object and then allowing its temperature to diminish slowly. Coatings on certain objects are heat-cured by heating the object after the coating has been applied. Seamed tubing is created by welding the adjoining edges of a ribbon of sheet metal that has been rolled into a circular configuration. Separate objects are often soldered or brazed together to form a singular part. Heating is also required when forging or forming a product. In these situations, the heat may be delivered from a flame or an electrical source.

Another technique for applying heat is induction heating. Induction heating involves applying an alternating magnetic field to the object. The alternating magnetic field induces eddy currents flowing in the object, and the induced eddy currents heat the object as a result of resistive current flow losses ($I^2R$) in the object. Of course, the effectiveness of induction heating depends on the ability of the object to conduct eddy currents.

The induced eddy currents flow in a circular pattern orthogonal to the direction of the flux lines of the magnetic field. Consequently, the shape of the object has a significant influence on the flow characteristics of the eddy currents, and as a consequence, on the heating characteristics of the object. For example, placing a flat and relatively thin sheet of material in a magnetic field with the flux intersecting the sheet orthogonally is very effective in generating heat in the flat sheet because the induced eddy currents flow in circular patterns within the flat sheet. The invention described in U.S. patent application Ser. No. 11/126,714 makes advantageous use of this orthogonal relationship of the eddy current and the magnetic flux in heating two or more sheets of material to heat-cure an adhesive material between the sheets and thereby bond the sheets together.

Uniform heating is usually required for heat treatment, because the desired characteristics of the heat treatment are generally not achievable unless the heating level is controlled. Uniformity of heating is generally more easily obtained when thermal energy is directly applied to the object, because the location of the flame heaters can generally be established to uniformly heat the object. The uniformity of heat treatment obtained from induction heating can be substantially more difficult, depending upon the shape of the object which is to be heated. For example, uniformly heating the exterior surface of an elongated or nonuniform object with induction heating can be virtually impossible if the surface of the object does not have a geometry which will interact in a uniform manner with the flux lines of the alternating magnetic field. Attempting to use parallel lines of magnetic flux at the exterior surface of a circular object would result in substantially different heating at different locations depending upon the geometry of the curved surface and the spacing of different points on the curved surface relative to the magnetic flux lines.

Induction heating has been used successfully to heat elongated objects by positioning an electromagnetic coil entirely around the elongated object. An example of such a prior art induction heating system 20 is shown in FIG. 1, where a hollow center induction coil 22 surrounds an elongated object represented by a metal rod 24. The coil 22 is formed by one or more windings or turns of an electrical conductor 26, and the metal rod 24 extends through an open center of the coil 22 with the rod 24 circumscribed by the windings of the electrical conductor 26. Electrical drive current 28 flows in the conductor 26 and creates magnetic flux within the open center of the coil 22. The flux lines of the magnetic flux in the coil 22 are oriented generally parallel to an axis through the coil 22 as represented at 30 in FIG. 2.

The magnetic flux 30 interacts with and flows axially through the metal rod 24. The axial flow of magnetic flux in the rod 24 induces an electrical eddy current 32 which flows circumferentially around the rod 24, in accordance with known electromagnetic principles. Each alternation of the phase of the driving current 28 conducted through the coil 22 causes the flow of the induced current 32 to change direction. However, the flow of the induced current 32 is always in the circumferential direction around the rod 24. The frequency at which the induced current 32 changes direction is directly related to the frequency of the magnetic flux 30, and the frequency of the magnetic flux 30 is established by the frequency of the drive current 28 conducted through the coil 22. Higher frequencies tend to cause the current 32 to pass through the outer surface or skin of the rod 24, while lower frequencies tend to induce the current 32 to pass more interiorly within the rod 24. In either event, the induced current 32 heats the bar 24, as a result of the induced current flowing through the inherent resistance of the conductive material of the bar and dissipating electrical power as heat. As a result, the temperature of the bar increases.

Because the induced electrical current 32 passes completely circumferentially around and through the bar 24, the bar is uniformly heated around its circumference. Assuming that the characteristic resistance of the bar material is uniform, the induced current passes through the entire circumferential path of uniform resistance material, thereby creating uniform heating along the circumferential path in which the eddy current 32 flows. The amount of heating along a linear portion of the bar is controlled by the speed at which the bar 24 is moved through the coil 22. Moving the bar more slowly creates more heat in the linear portion, and moving the bar more rapidly creates less heat in the linear portion, under conditions of a constant amount of magnetic flux 30. By moving the bar at a uniform axial rate through the coil 22, the bar is uniformly and completely heated along its length.

Using the induction heating coil 22 with an open center through which an elongated object is inserted and moved in a controlled manner allows the entire length of the elongated object to be uniformly heat treated with an induction heating system 20 (FIG. 1). Thus, an elongated object, such as an axle, can be surface hardened by heating the surface of the axle in the coil 22 and then quenching its temperature. An elongated object, such as metal wire, can be annealed by heating the wire in the coil 22 and thereafter allowing the temperature to dissipate slowly. Welded seam tubing may be created by extending a circular rolled metallic sheet through the coil 22, and inducing enough circumferential current in the circular rolled sheet to arc-weld the abutting edges together.

The use of an open center induction heating coil creates certain difficulties. It is impossible to remove the induction heating coil from around a lengthy elongated object without cutting the object to withdraw the object from within the coil. While cutting the object may be acceptable in certain circumstances, or not a factor in circumstances were the object itself is relatively short, cutting the object creates significant problems in very long objects, such as welded seam tubing or long wires or cables. Under normal circumstances, it is not necessary to remove the open center induction heating coil from around the elongated object, but in those circumstances where some manufacturing difficulty has occurred, it may be necessary to remove the elongated object from the coil.

Another difficulty in using an open center induction heating coil is that not all types of elongated objects will fit through the heating coil. Only those objects which have a uniform diameter or outside configuration will normally be uniformly heated. Any ridges, extensions or other nonuniformities in the elongated object may prevent it from extending through the coil or prevent adequate heat treatment of the object. If a larger coil is used to accommodate the nonuniformities, the variations in diameter or distance from the center of the object will have a variation on the amount of eddy current induced by the coil, and will therefore create variations in heating along the length of the elongated object. Moreover, it is difficult or impossible to heat treat only a portion of the elongated object without incurring the difficulty of manually inserting or threading the elongated object through the coil to locate the coil around that portion of the elongated object which is to be heated.

A further disadvantage of the open center coil induction heating system 20 (FIG. 1) is its relative inefficiency. The coil 22 is required to conduct enough drive current 28 to elevate the temperature of the rod 24. A typical coil 22 may be required to conduct a drive current in the neighborhood of 3000 amps. Such a high drive current causes the coil itself to heat because of the conduction of the high drive current. The amount of heat produced in the coil 22 itself from conducting the high drive current 28 is sufficient to melt the conductor 26 unless the coil 22 is cooled. It is for this reason that the electrical conductor 26 of the coil 22 is formed from an electrically conductive tubing (not shown). The tubing defines a central passageway for carrying a liquid or gas coolant (not shown) through the tubing of the coil 22 to remove the heat created by the drive current 28 conducted in the wall of the tubing. The tubing which forms the coil 22 must have adequate wall thickness to withstand high densities of the drive current 28. The size of the interior passageway in the tubing must be large enough to carry enough coolant at a sufficient flow rate to remove the heat to prevent destruction of the coil and to maintain a safe operating temperature. These practical considerations limit the minimum size of the coil, and also limit the number of turns or windings of the coil, usually to one turn or a few turns.

A separate cooling system (not shown) is required to circulate the coolant through the tubing of the coil 22 and to dissipate or exchange the heat removed. The cooling system and the coolant must be electrically insulated from the coil 22 to prevent short-circuiting the current 28 away from the coil 22. The separate cooling system 26 increases the procurement cost of the induction heating system 20, as well as its operating cost since energy is consumed in operating the cooling system.

In addition to the separate cooling system, supplying the very high amperage, high-frequency drive current 28 to the coil 22 is also complicated. The typical electrical power 34 for the induction heating system 20 is 480 volt, three-phase, 60 cycle AC commercial power. High voltage electrical power 34 is required to deliver enough electrical power to satisfy the high drive current requirements for the coil 22. A rectifier 36 converts the AC commercial power 34 into DC power. An inverter 38 generates an alternating intermediate waveform 40 having the high-frequency characteristic at which the magnetic flux will be produced by the coil 22. Because the typical inverter 38 is not capable of directly generating the high drive current 28 necessary for the coil 22, the high-frequency intermediate waveform 40 is applied to an intermediate conversion transformer 42. The intermediate conversion transformer 42 converts the intermediate waveform 40 into the high amperage drive current 28 that is then conducted to the coil 22. The drive current 28 has the same high frequency as the inverter 38 establishes for the intermediate waveform 40.

The induction heating system 20 therefore requires four electrical energy conversion steps: a first conversion from 480 volt, three-phase 60 cycle AC commercial power 34 to DC power; a second conversion from DC power to the high-frequency intermediate waveform 40; a third conversion from the intermediate waveform 40 into the very high amperage drive current 28 applied to the coil 22; and a fourth conversion from the drive current 28 to the magnetic field which interacts with the elongated object represented by the metal rod 24. Each of these conversions involves energy losses, because energy losses are simply inherent in the electrical equipment which perform these conversions. As a result, a significant amount of the electrical power 34 delivered to the induction heating system 20 is consumed in these conversions and is therefore lost before the magnetic field has been created. Moreover, a significant amount of energy of the drive current 28 delivered to the coil 22 is consumed in heating the coil 22 itself, and that energy is also lost and is not available to heat the bar 24.

Further still, a significant amount of the magnetic flux generated by the coil 22 is lost by leakage into the air surrounding the coil 22 without interacting with the object. The energy consumed in generating this leakage flux is also lost. The leakage flux results principally from using air as the medium for conducting the flux generated by the coil 22 to the object. Air has a very limited capability of confining and directing magnetic flux, and for that reason, much of the generated flux leaks away before it can be applied to the object. The ability of a medium to confine and direct magnetic flux is referred to as its permeability. Air has a permeability of 1.0, which is the lowest permeability of any material that directs magnetic flux. It is necessary to locate the windings of the coil 22 as close as possible to the object to minimize the flux leakage, but the close location of the windings to the elongated object prevents an object with any significant exterior nonuniformities from fitting through the open center coil 22. As a consequence of the leakage flux, only a reduced portion of the magnetic flux actually generated by the coil is directed into the object and is therefore available to generate the heat necessary to perform work on the object.

All of these losses make coil-type induction heating systems 20 inefficient. Only a small fraction of the energy supplied to a coil-type induction heating system is actually converted into the desired heat. For example, in the neighborhood of only 35 percent of the input energy delivered to a typical coil-type induction heating system 20 is actually available to heat the object. The lost energy is an added cost for operating coil-type induction heating systems 20. Moreover, because of the conversion losses, the rectifier 36, inverter 38 and intermediate transformer 42 must have greater capacities to supply the additional electrical power which will ultimately be lost. The requirement for greater capacity of these electrical components increases the acquisition cost of coil-type induction heating systems 20.

SUMMARY OF THE INVENTION

The present invention allows elongated workpieces and workpieces with an exterior nonuniform shape or configuration, to be inductively heated very efficiently and effectively. A magnetic flux guide confines and directs the magnetic flux onto the workpiece, and the flux guide accommodates nonuniformities in the exterior shape or configuration of the workpiece. Elongated objects can be inserted into the flux guide and moved in such a way to achieve uniform heating over the entire length of the elongated workpiece and circumferentially over certain nonuniform exterior features of the elongated workpiece. The characteristics of the magnetic flux guide permit the elongated workpiece to be heated using the flux guide without requiring the elongated object to be severed and threaded through confining openings. The characteristics of the magnetic flux guide also permit a nonuniformly shaped portion of a workpiece to be heated separately from the remaining portion of the workpiece to obtain the desired heat treatment characteristics of the nonuniformly shaped portion. Significant increases in heating efficiency and energy consumption are achieved by use of the flux guide. The size and capacity of the electrical components may be reduced. The physical size of the required equipment is reduced. Magnetic flux is applied more precisely and uniformly to develop more uniform and better regulated temperature throughout the workpiece.

One aspect of the invention relates to a method of induction heating an elongated and electrically conductive workpiece. In accordance with this method, an alternating magnetic flux is created and flows longitudinally in and around the elongated workpiece. A difference in an amount of magnetic flux flowing in a portion of the elongated workpiece is established compared to the amount of magnetic flux around the elongated workpiece at the same portion, and the difference is sufficient to induce eddy currents flowing circumferentially flowing exteriorly of the portion of the workpiece and thereby heat that portion of the workpiece. The alternating magnetic flux is conducted to the workpiece in a high permeability flux guide.

Further aspects of the method involve using a flux guide having a closed geometric configuration except at a gap which extends transversely across the flux guide, extending the elongated workpiece along openings in the flux guide on opposite sides of the gap with a portion of the elongated workpiece extending through the gap in a direction aligned with the direction of flux flow across the gap, allowing magnetic flux from the flux guide to flow from the openings into the elongated workpiece and through the portion of the workpiece within the gap, allowing magnetic flux to flow through the gap at the exterior of the portion of the workpiece within the gap, establishing the difference in the amount of flux flowing through the portion of the workpiece within the gap compared to the amount of flux flowing exterior of the workpiece within the gap to induce the eddy currents flowing circumferentially around the portion of the workpiece within the gap, and maintaining the portion of the workpiece within the gap for a predetermined amount of time sufficient for the circumferential eddy currents to heat the portion of the workpiece within the gap.

Another aspect of the invention relates to a flux guide induction heating device for heating an elongated and electrically conductive workpiece. The device comprises a high permeability flux guide formed in a closed geometric configuration except at a gap which extends transversely across the flux guide. A multi-turn coil is positioned around the flux guide for conducting an alternating drive current by which to induce an alternating magnetic flux flow in the flux guide and across the gap. Elongated aligned openings are formed in segments of the flux guide on opposite sides of the gap within which to receive the elongated workpiece and by which to locate a portion of the elongated workpiece extending through the gap in a direction generally aligned with the direction of flux flow across the gap. The openings permit the magnetic flux from the flux guide to flow into the elongated workpiece and through the portion of the workpiece within the gap to a different extent than the flux flows across the gap at the exterior of the portion of the workpiece within the gap. The difference between the amount of flux flow through the portion of the workpiece within the gap and the amount of flux flow exterior of the workpiece within the gap induces eddy currents flowing generally circumferentially within the portion of the workpiece within the gap to heat the portion of the workpiece within the gap from resistive losses.

Further aspects of both the method and device of the invention relate to some or all of the following features. The workpiece is advanced longitudinally to move the portion of the workpiece within the gap after the portion has been heated. Aligned holes or channels in segments of the flux guide on opposite sides of the gap receive the elongated workpiece. Flux linkage pieces are placed over the channels to confine the flux in the channels and direct the flux into the elongated workpiece. The elongated workpiece is placed in and removed from the channel by transverse movement, which conveniently separates the flux guide from the elongated workpiece without requiring the workpiece to be cut or threading the workpiece through the flux guide. Nonuniform portions of the workpiece can be placed within the gap due to the transverse movement, allowing the nonuniform portions to be heated. Two flux guides are separated laterally with respect to one another with the space between the laterally separated flux guides receiving the elongated workpiece. Multiple coils may be wound around the flux guide by which to conduct separate drive currents and thereby achieve multiple frequency induction heating. Use of the flux guide permits the drive current to be directly converted from DC power, and commercial AC power may be directly converted into the DC power prior to converting the DC power directly into the alternating drive current.

A more complete appreciation of the scope of the present invention and the manner in which it achieves the above-noted and other improvements and beneficial aspects can be obtained by reference to the following detailed description of presently preferred embodiments of the invention taken in connection with the accompanying drawings, which are briefly summarized below, and by reference to the appended claims.

BRIEF DESCRIPTION OF THE DRAWINGS

FIG. 1 is a block and schematic diagram of a prior art coil-type induction heating system.

FIG. 2 is a perspective view of an object shown in FIG. 1, with arrows illustrating magnetic flux induced in the object and electrical current conducted by the object.

DETAILED DESCRIPTION

Figure 3:
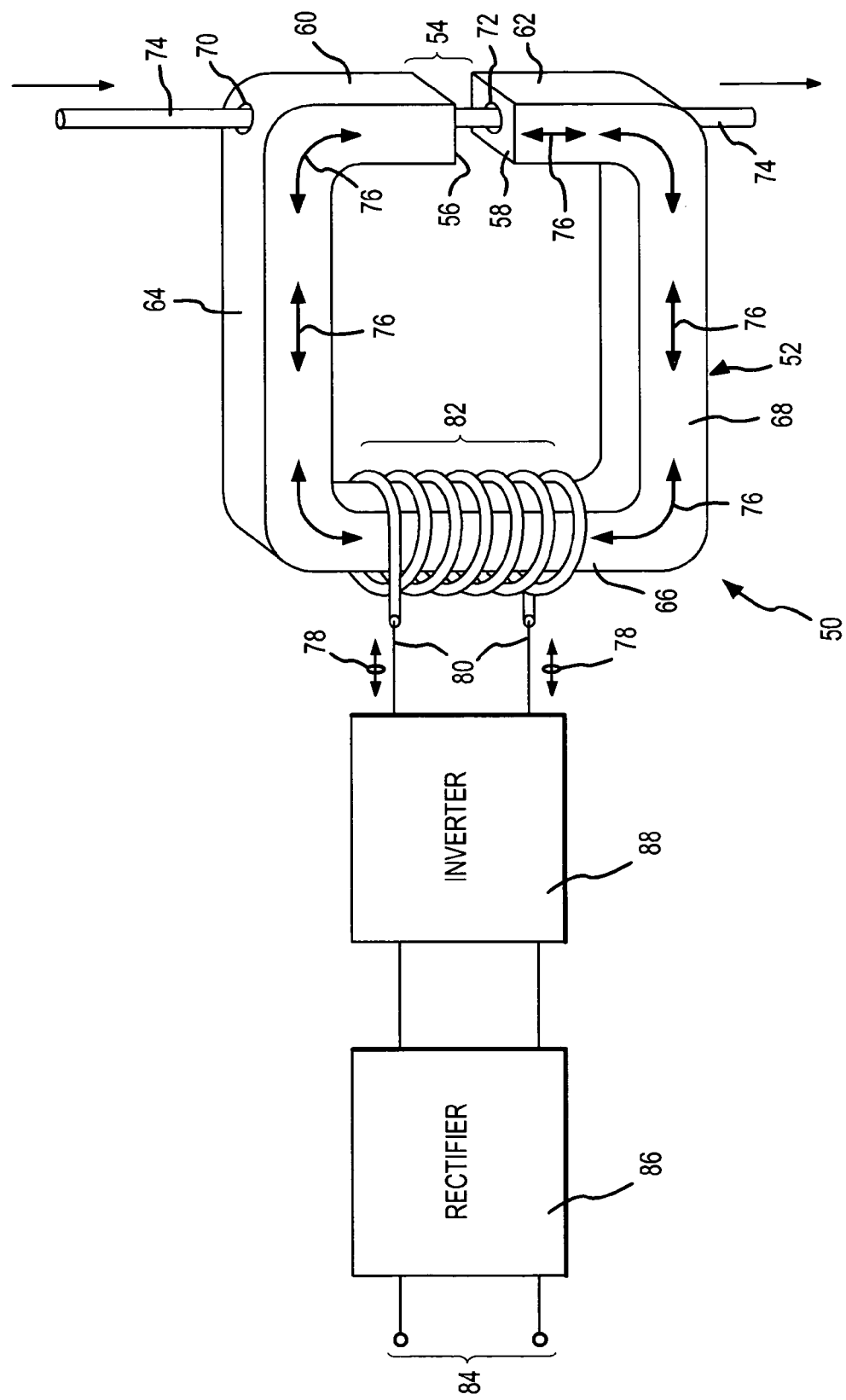
FIG. 3 is a block and schematic diagram of a flux guide induction heating device in accordance with the present invention.

A flux guide induction heating device 50 which incorporates the present invention is shown in FIG. 3. The device 50 includes a flux guide 52 which is formed of laminated or solid core material having a high permeability, such as power ferromagnetic material or one of a wide variety of known metallurgically-formulated, high permeability magnetic core materials typically used for cores in transformers. The flux guide 52 has a closed geometric configuration, except for a gap 54 which extends transversely across the flux guide 52. The gap 54 is defined by opposing faces 56 and 58 of segments 60 and 62 of the flux guide 52. Segments 64, 66 and 68 are connected with the segments 60 and 62 to complete the flux guide 52 in a closed geometric configuration, except at the gap 54.

Parallel and aligned holes 70 and 72 are formed through the segments 60 and 62, respectively. An elongated object or workpiece 74 is inserted through the aligned holes 70 and 72 and through the gap 54. Magnetic flux 76 is induced in and flows through the flux guide 52 by an electrical drive current 78 conducted through a conductor 80. The conductor 80 forms a coil 82 that surrounds the segment 66 of the flux guide 52. The magnetic flux 76 surrounds those portions of the workpiece 74 within the holes 70 and 72 in the segments 60 and 62. The magnetic flux 76 enters the portions of the workpiece 74 within the holes 70 and 72 as a result of the physical proximity of the workpiece with the flux guide in those holes.

If the workpiece 74 has a higher magnetic permeability than air, magnetic flux 76 will flow through that small portion of the workpiece 74 within the gap 54. Some magnetic flux 76 will also bridge between the faces 56 and 58 of the segments 60 and 62 through the workpiece. If the workpiece 74 has a relatively low magnetic permeability, the magnetic flux 76 will flow principally in the gap 54 between the opposing faces 56 and 58 of the segments 60 and 62. The low permeability will establish a relatively small amount of flux within the workpiece. In either case of a high or low permeability workpiece, a differential in flux exists in the gap 54 at the exterior of the workpiece 74 compared to the flux within the workpiece. This differential in flux density induces eddy currents 32 (FIG. 2) which flow circumferentially within and around the workpiece 74, regardless of whether the magnetic flux density is larger at the exterior of the workpiece 74 or larger within the interior of the workpiece 74. The flux differential between the interior and the exterior of the workpiece 74 induces the eddy currents 32 to flow circumferentially around the portion of the workpiece 74 within the gap 54.

The circumferentially-induced eddy currents 32 interact with the inherent resistance of the molecular and crystalline structures of the workpiece 74 and dissipate electrical power in an amount related to the square of the magnitude of the induced eddy currents multiplied by the inherent resistance ($I^2R$) of the material of the workpiece. This electrical power is dissipated as heat. The circumferentially-induced eddy currents heat that portion of the elongated workpiece 74 located within the gap 54. The heating is uniform because the induced eddy currents flow in complete loops circumferentially around and within and through the inherently uniform resistance of the material of the workpiece 74 which is located in the gap 54.

The extent of uniform heating of that portion of the elongated workpiece 74 located within the gap 54 is controlled by the rate at which the elongated workpiece 74 is moved longitudinally or axially through the holes 70 and 72. A greater rate of movement results in less heating as the heated portion traverses the gap 54, while a slower rate of movement results in greater heating.

The extent of heating is also controlled by the amount of magnetic flux 76 which is induced into the flux guide 52. The amount of flux 76 in the flux guide 52 is directly related to the amount of drive current 78 which is conducted through the coil 82. The amount of magnetic flux 76 in the flux guide controls the magnitude of the flux differential in the gap 54, and it is the amount of flux differential which directly controls the magnitude of the induced eddy currents. Larger eddy currents result in larger power dissipation and increased heating. The heating capacity is therefore related to the amount of drive current 78 supplied to the coil 82.

The flux guide induction heating device 50 is powered by commercial alternating current (AC) power supplied at 84 from conventional distribution mains. The AC power 84 is rectified into direct current (DC) power by a conventional rectifier 86. The DC power from the rectifier 86 is supplied to a conventional inverter 88. The inverter 88 converts the DC power into the drive current 78 which has a bipolar pulsating or alternating characteristic occurring at a predetermined high frequency established by the inverter 88. The high frequency drive current 78 from the inverter 66 is conducted through the conductor 80 of the coil 82.

The amount of magnetic flux 76 induced in the flux guide 52 by the high frequency drive current 78 is directly related to the number of turns of the electrical conductor 80 which forms the coil 82 around the segment 66 and the magnitude of the high frequency drive current 78. The frequency of the magnetic flux 76 induced in the flux guide 52 is the same frequency as the bipolar pulsating or alternating drive current 78 created by the inverter 88. The direction that the flux 76 flows in the flux guide 52 changes twice with each cycle of the high frequency drive current 78.

The flux 76 is substantially confined within the segments 60, 62, 64, 66 and 68 of the flux guide 52 due to the high permeability of the material which forms the flux guide, compared to the significantly lower permeability of the air which surrounds the flux guide. Substantial benefits result from using a high permeability material for the flux guide 52.

The best benefits of the present invention result from a flux guide having permeability of greater than approximately 500, and preferably at least 2000. However, significant benefits are available from a flux guide having permeability as low as approximately 100. The high permeability of the flux guide 52 confines the vast majority of the flux generated by the coil 82 to the flux guide 52 without leakage, except at the gap 54.

In addition to its permeability, the flux guide 52 should be constructed from material which does not saturate magnetically at the level of the magnetic flux 76 created by the drive current 78 conducted through the coil 82. Avoiding magnetic saturation results in maximum power conversion from the energy of the drive current 78 into the energy of the magnetic flux 76. The material from which the flux guide is made should also exhibit adequate frequency responsive characteristics to avoid significant attenuation at the frequency of the bipolar pulsating or alternating drive current 78.

The workpiece 74 should have the capability of conducting electrical current in order that eddy currents can be induced in the material to heat the material. For example, copper and aluminum have a permeability of 1.0, as does air, but both copper and aluminum will be heated by the alternating magnetic flux flowing within the gap 54 because both metals are electrically conductive and therefore have the capability of conducting the eddy currents which dissipate the energy from the magnetic flux as heat. A material with a permeability greater than 1.0 which occupies the gap 54, such as iron or steel, contributes to the flow of flux through the flux guide 52 by reducing the reluctance through the gap 54. The reduced reluctance increases the flux differential which heats the higher permeability material because of increased eddy current flow through that material.

While the embodiment of the present invention shown in FIG. 3 is very effective in heating a continuous elongated workpiece 76, it is impossible to remove the workpiece 76 from within the holes 70 and 72 without severing the workpiece. Under some circumstances, such as annealing a relatively long length of continuous wire, the elongated wire cannot be severed. Thus, complications arise if it becomes necessary to remove the wire from the holes 70 and 72. The embodiment 90 of the flux guide shown in FIG. 4, permits the elongated workpiece to be removed from the flux guide without severing the workpiece.

Figure 4:
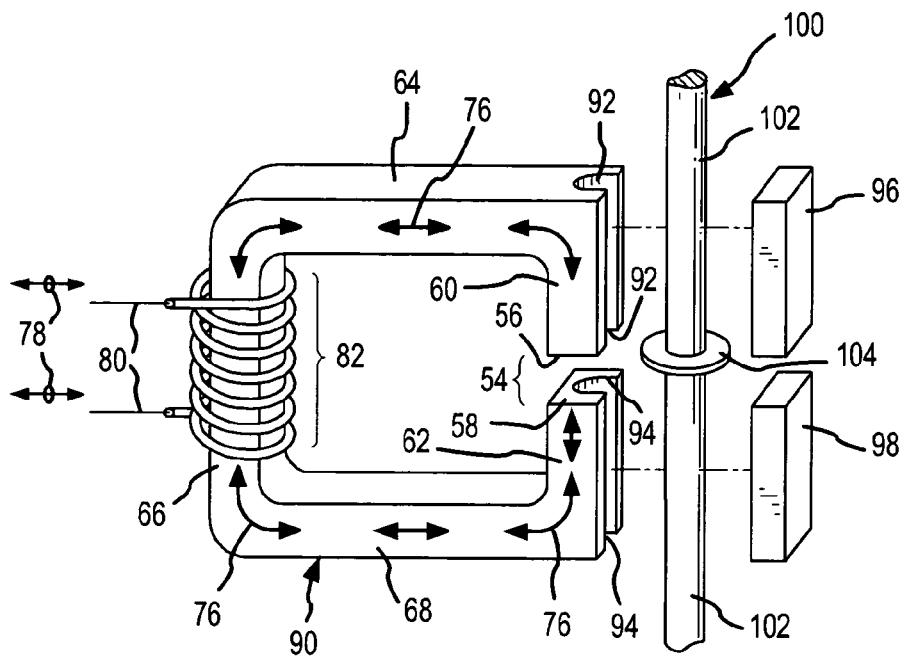
FIG. 4 is a perspective view of an alternative form of a flux guide which may be used in substitution for the flux guide shown in FIG. 3.

The flux guide 90 shown in FIG. 4 has channels 92 and 94 which extend inward from an exterior surface of the segments 60 and 62, respectively. Like the holes 70 and 72 (FIG. 3), the channels 92 and 94 are aligned with one another and are therefore capable of receiving the elongated workpiece 74 (FIG. 3). However, rather than threading the elongated workpiece 74 through the holes 70 and 72 (FIG. 3), the elongated workpiece 74 can be inserted transversely directly into the channels 92 and 94. Similarly, if it is necessary to remove the elongated workpiece from the flux guide 90, the separation is easily accomplished by withdrawing the flux guide transversely away from the workpiece.

Although one side of the channels 92 and 94 is open in the sense that the material of the flux guide segments 60 and 62 does not completely surround the channels 92 and 94, the efficiency in converting the magnetic flux 76 within the flux guide 90 into heat is approximately the same as the efficiency achieved by the flux guide 52 with the completely enclosed holes 70 and 72 in the segments 60 and 62 (FIG. 3). The similar efficiency results because flux guide material which surrounds the channels 90 and 92 is sufficient to induce almost as much magnetic flux into the workpiece as is induced by the flux guide with the completely surrounding holes 70 and 72 (FIG. 3), in the case of the workpiece having a relatively high permeability. In the case of the workpiece having a relatively low permeability, a sufficient amount of magnetic flux flows between the faces 56 and 58 around the channels 92 and 94 to establish an adequate flux differential within the gap 54. In either case, an almost-equivalent flux differential is available to induce the circumferential eddy currents. While the flux differential may not exist uniformly around the complete circumference of the elongated workpiece in the flux guide 90, enough flux differential exists to assure that the induced eddy currents flow circumferentially around the entire workpiece. Heating the workpiece with the flux guide 90 shown in FIG. 4 is approximately 90 percent as effective as heating the workpiece with the flux guide 52 shown in FIG. 3, for the same amount of magnetic flux 76 created within the flux guide.

Figures 5, 6:
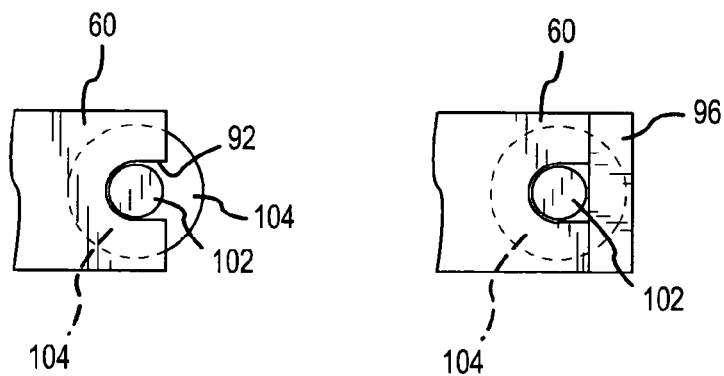
FIG. 5 is a top view of the flux guide shown in FIG. 4 with the object inserted into a channel of the flux guide.
FIG. 6 is a view of the flux guide shown in FIG. 5 with flux linkage pieces attached to the flux guide shown in FIG. 4, to create effects similar to those created by the flux guide shown in FIG. 3.

In those cases where use of the transversely-accessible channels 92 and 94 of the flux guide 90 is desired, but increased efficiency or more uniform circumferential flux affects similar to that obtained by the flux guide 52 (FIG. 3) is desired, flux linkage pieces 96 and 98 may be attached to the segments 60 and 62 to cover the channels 92 and 94, as shown in FIGS. 4 and 6. The flux linkage pieces 96 and 98 preferably have approximately the same magnetic permeability as the core material of the flux guide 90. By attaching the flux linkage pieces 96 and 98 to the segments 60 and 62 to enclose the channels 92 and 94 after the elongated workpiece has been inserted within the channels 92 and 94, flux is distributed from the segments 60 and 62 by the linkage pieces 96 and 98 substantially uniformly around the elongated workpiece. The more uniform flux distribution occurs within the channels 92 and 94, and extends within the gap 54 more uniformly surrounding the workpiece. Thus, the flux differential in the gap 54 is more uniform, which assists in achieving effects essentially the equivalent of those obtained by the flux guide 52 (FIG. 3). Since the flux linkage pieces 96 and 98 are removable, it is still possible to transversely separate the flux guide 90 from the elongated workpiece while obtaining the benefits of more uniform flux distribution and flux differential within the gap 54.

Another significant advantage of the flux guide 90 shown in FIG. 4 is that it will accept and allow heating of a nonuniformly shaped workpiece 100. The workpiece 100 shown in FIG. 4 is simply exemplary of a nonuniform shaped workpiece, and is illustrated as having a shaft 102 to which a collar 104 is attached. The transverse outward extension of the collar 104 from the shaft 102 creates the nonuniformity in the general shape of the workpiece 100. The nonuniformity created by the collar 104 prevents the shaft 102 from being inserted in the holes 70 and 72 of the flux guide 52 (FIG. 3). However, because the channels 92 and 94 of the flux guide 90 are transversely accessible for receiving the shaft 102 with the collar 104 positioned in the gap 54, the collar 104 may be heated by induction. The flux differential in the gap interacts with the collar 104 and causes the eddy currents to flow around the collar 104. The collar is heated as a result of those eddy currents. Once heated, the workpiece 100 may be removed from the flux guide 90 to allow the collar 104 to be quenched or slowly cooled, depending upon the type of heat treatment desired.

As shown in FIG. 5, the heat treatment to the collar 104 may be accomplished by placing the workpiece 100 directly into the channels 92 and 94. A sufficient flux differential exists over enough of the circumference and surface area of the collar 104 to induce the circumferential eddy currents completely around the collar 104. The induction of the circumferential eddy currents may be enhanced by relative rotation of the workpiece 100 and the flux guide 90, with the workpiece positioned as shown in FIG. 5. Using the flux linkage pieces 96 and 98, shown in FIG. 6, also more uniformly distributes the flux throughout the gap 54 (FIG. 4) and around the circumference and surface area of the collar 104. While the use of the flux linkage pieces 96 and 98 may establish more uniform flux distribution and differential effects, the use of those flux linkage pieces is not required to obtain adequate heating of all types of nonuniformly shaped workpieces.

Figure 7:
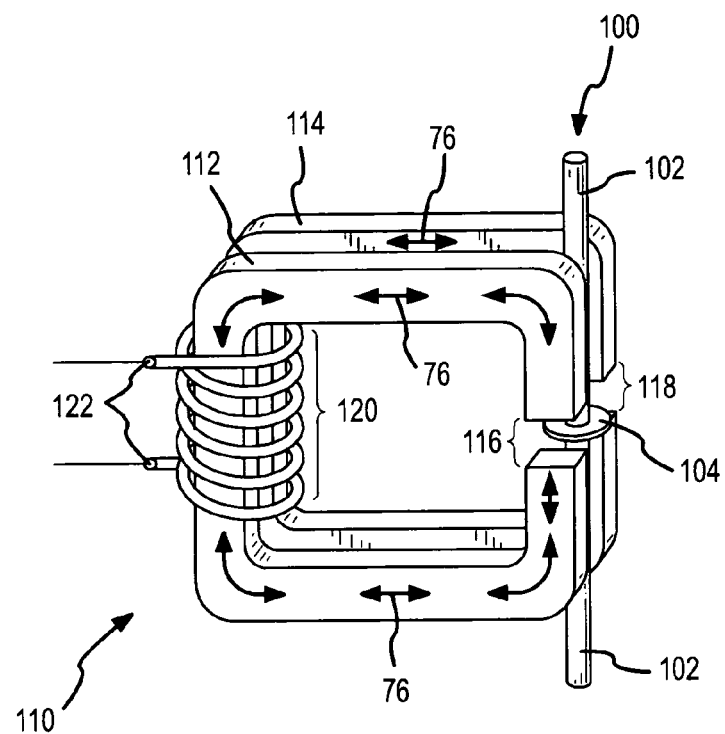
FIG. 7 is a perspective view of an alternative form of a flux guide which may be used in substitution for the flux guides shown in FIGS. 3 and 4.

Another embodiment 110 of a flux guide which is suitable for use with the flux guide induction heating device 50 (FIG. 3) is illustrated in FIG. 7. The flux guide 110 uses two separate and spaced apart cores 112 and 114. Each of the cores 112 and 114 has a closed geometric configuration, except at gaps 116 and 118, respectively. Each of the cores 112 and 114 has essentially the same magnetic characteristics as previously described for the flux guides 52 and 90. Each of the gaps 116 and 118 are approximately of the same length thus causing the distance across the gaps 116 and 118 to be approximately the same. A single coil 120 is formed by a single conductor 122 which is wound around both of the cores 112 and 114. Because the single coil 120 is wound around both cores 112 and 114, substantially an equal amount of flux is induced by the coil 120 into each of the cores 112 and 114.

Because the cores 112 and 114 are spaced apart from one another in the area adjacent to the gaps 116 and 118, space is available to accommodate a nonuniformly shaped workpiece, such as the workpiece 100. The space between the cores 112 and 114 allows the shaft 102 of the workpiece 100 to be inserted between the cores 112 and 114. With the shaft 102 positioned between the cores 112 and 114, the collar 104 is easily located within the gaps 116 and 118. The flux differential created in the gaps 116 and 118 is created by the magnetic flux conducted by the cores 112 and 114, and that flux differential creates the eddy currents within the collar 104 which heats the collar. Even though the flux differential is created by the separate flux conduction in each of the cores 112 and 114 and is distributed separately within the gaps 116 and 118, substantial uniformity in flux distribution and flux differential exists to cause uniform heating effects on the collar 104. Since both cores 112 and 114 have similar magnetic properties and because a single coil induces the same amount of magnetic flux in both cores, the flux contribution through the gaps 116 and 118 by each of the cores is approximately the same. More uniform effects can be achieved, if desired, by rotating the workpiece 100.

The space between the cores 112 and 114 allows the workpiece 100 to be easily inserted and removed. The amount of transverse space between the separate cores 112 and 114 at the gaps 116 and 118 may be adjusted by pivoting the cores 112 and 114 with respect to each other around the coil 120. Of course, the coil 120 must be wound around the cores 112 and 114 in such a way to permit this relative pivoting movement. Under this circumstance, the amount of transverse space between the cores at the gaps 116 and 118 may be adjusted to accommodate different nonuniform shapes of the workpiece, such as different diameters of the shaft 102, for example.

Figure 8:
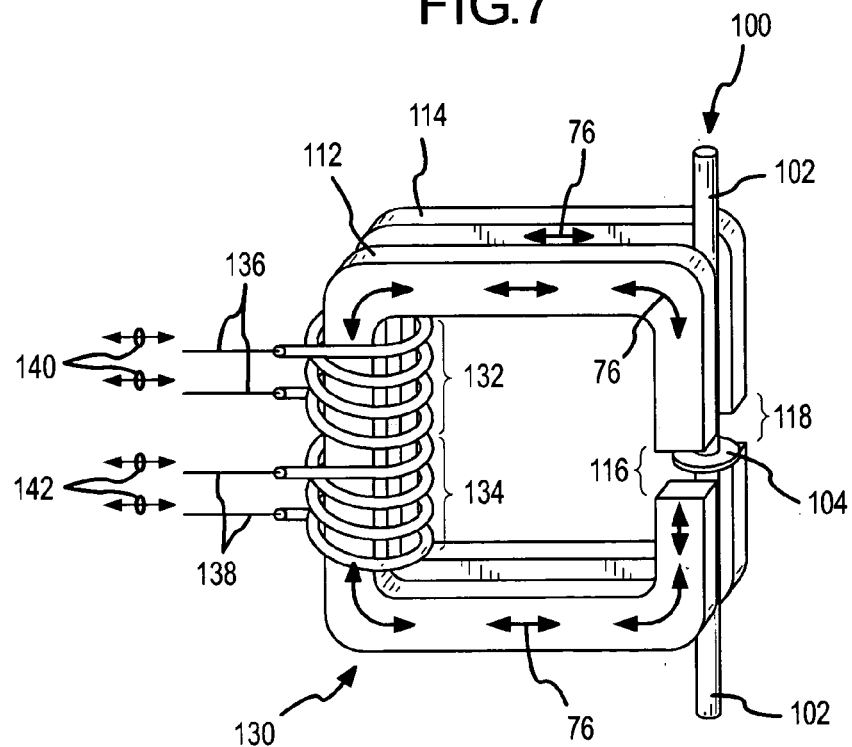
FIG. 8 is a perspective view of a further alternative form of a flux guide which may be used in substitution for the flux guides shown in FIGS. 3, 4 and 7.

Another embodiment 130 of a flux guide which is suitable for use with the flux guide induction heating device 50 (FIG. 3) is illustrated in FIG. 8. The flux guide 130 is similar to the flux guide 110 (FIG. 7) except that the flux guide 130 uses two separate coils 132 and 134. The coil 132 is formed by a single conductor 136 which is wound around both cores 112 and 114. The coil 134 is formed by another single conductor 138 which is also wound around both cores 112 and 114. Separate drive currents 140 and 142 are conducted through each of the coils 132 and 134.

Using different drive currents 140 and 142, each having a different frequency, induces two different frequencies of magnetic flux into the cores 112 and 114 and causes the magnetic flux to interact with the elongated workpiece 74 (FIG. 3) or the nonuniform workpiece 100 at two different frequencies. Using two different frequencies of magnetic flux is referred to as dual frequency induction heating. Higher frequencies of magnetic flux generate higher frequency eddy currents, and the higher frequency eddy currents tend to circulate at or near the exterior surface or skin of the workpiece. Lower frequencies of magnetic flux generate lower frequency eddy currents, and the lower frequency eddy currents tend to circulate near the interior of the workpiece. Thus, using multiple frequencies allows the heating effect to be focused at different levels or multiple depths within the workpiece. This is particularly important in certain types of heat treating, where the heat treatment is desired to be focused at a certain physical characteristic or depth of the workpiece. Dual frequency induction heating permits selective heat treatment effects at different depths within the workpiece. This can be a substantial benefit in surface hardening, because the desired metallurgical effect can be achieved where it is most desirable, which may not necessarily be on the outermost surface.

Although each of the coils 132 and 134 is shown wrapped around both of the cores 112 and 114, substantially equivalent effects can be achieved by winding each of the coils 132 and 134 around a different one of the cores 112 and 114. Such a circumstance is the equivalent of using two separate flux guides on the workpiece simultaneously with each separate flux guide energized by a different frequency drive current. As another alternative to the flux guide 130 formed by two separate cores 112 and 114 as shown in FIG. 8, the flux guide 130 could also be formed by a single core such as those employed in the flux guides 52 and 90 (FIGS. 3 and 4), with separate coils 132 and 134 wound around the single core.

Figure 9:
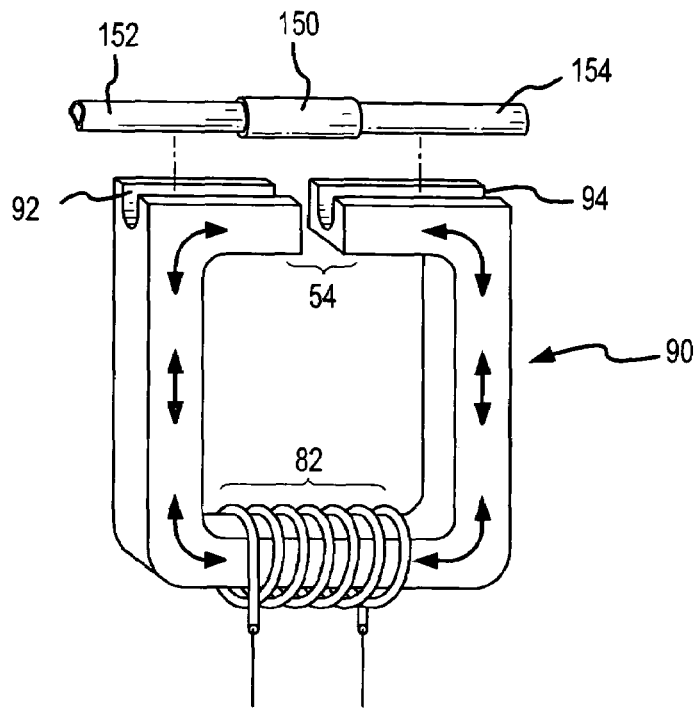
FIGS. 9 and 10 are illustrations of the flux guide shown in FIG. 4 used for soldering or brazing tubular workpieces.
Figure 10:
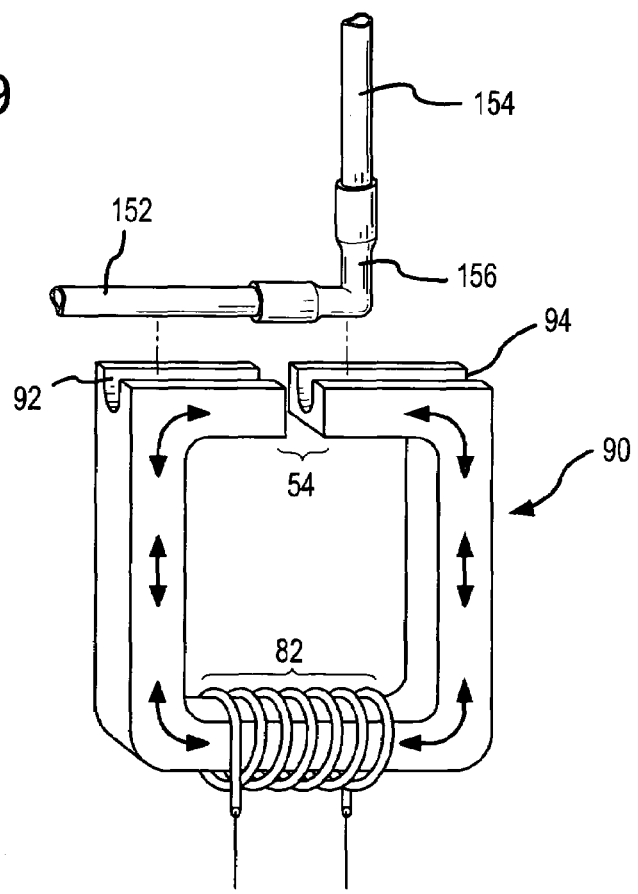

Examples of the use of the flux guide induction heater device 50 for soldering or brazing are shown in FIGS. 9 and 10. In these examples, the channels 92 and 94 of the flux guide 90 are transversely positioned relative to fittings used to connect pieces of tubing together.

As shown in FIG. 9, a coupling-type fitting 150 is used to connect two pieces 152 and 154 of tubing. The coupling 150 and the tubing pieces 152 and 154 may be formed of copper, for example. Although copper has a magnetic permeability of approximately 1, copper has a relatively high electrical conductivity. Placing the coupling 150 within the gap 54 and the tubing pieces 152 and 154 in the channels 92 and 94 induces the circular eddy currents in the coupling 150 and the ends of the tubing pieces 152 and 154 which are to be connected by the coupling 150. The eddy currents heat the coupling 150 and the tubing pieces 152 and 154 to a temperature sufficient to melt solder which is added to the space between the coupling and the tubing pieces. The solder may be added as paste solder before the coupling and tubing pieces are assembled together or may be melted and wicked into the space between the coupling and the tubing pieces after heating. The solder may also contain material components which are influenced by the induced magnetic field to assist in heating. Once the solder has been sufficiently melted to join the coupling 150 with the tubing pieces 152 and 154, the flux guide 90 is withdrawn transversely away from the connected coupling 150 and tubing pieces 152 and 154.

As shown in FIG. 10, an elbow-type fitting 156 is used to connect the two tubing pieces 152 and 154. The elbow 156 is soldered to the tubing pieces 152 and 154 in the same manner as has been described in conjunction with FIG. 9, except that one of the connection joints, for example between the elbow 156 and the tubing 152, is first soldered before the other connection joint between the elbow 156 and the tubing 154 is soldered. The channels 92 and 94 in the flux guide 90 permit heating each of the joints created by the nonuniform configuration of the fittings and tubing pieces. Similar effects to those illustrated by FIGS. 9 and 10 can be accomplished when brazing separate parts together.

The flux guide induction heating device 50 can also be used to cure heat-curable adhesive material placed between electrically conductive sheet pieces, in the same manner as described in the above referenced U.S. patent application Ser. No. 11/126,714. In such a circumstance, the flat sheets of material are inserted into the flux gap in the flux guide with the sheets parallel to the faces of 56 and 58 (FIG. 3) which define the flux gap and orthogonal to the direction of flux flow through the gap. The flux induces eddy currents in the sheet material which heats the sheet material and heat-cures the adhesive material which has been placed between sheets. Non-electrically conductive sheet materials can be bonded together in a similar manner, provided that the adhesive material generates heat in response to interaction with the magnetic flux. Consequently, a single flux guide may be capable of heating both uniformly and nonuniformly shaped elongated workpieces as well as substantially flat objects.

The benefits of induction heating with a flux guide of the types 52, 90, 110 and 130 are numerous and substantial. The high permeability flux guide conducts substantially all of the magnetic flux 76 induced by the winding(s) into the workpiece and the gap to create the flux differential which induces the circumferential eddy currents necessary to heat the workpiece. Very little magnetic flux induced by the winding(s) in the flux guide is lost to leakage, compared to the substantial amount of flux that is lost to the air when using the prior art coil 22 (FIG. 1). Consequently, the flux guide is considerably more efficient in delivering the flux to heat the workpiece.

The greater availability of flux 76, and the relative ease of inducing the flux in the flux guide by increasing the number of turns of the conductor which form each winding, offers the capability of heating the workpiece at an increased rate to diminish the amount of time necessary to obtain sufficient heating. Heating the workpiece more quickly obtains the commercial benefit of reducing the time and expense of manufacturing each commercial product. The area in the workpiece where the heat is induced is in the gap where the flux differential exists. Precision in the location and the degree of heating is obtained by locating the workpiece in the gap and directing the flux with the flux guide.

There is no possibility of an electrical hazard to personnel who might inadvertently touch the flux guide. The flux guide does not conduct electrical current, unlike the prior art coil 22 (FIG. 1) which may conduct very high levels of current. Consequently, inadvertently touching the flux guide or inserting a finger or other part of the human anatomy into the gap will not cause injury due to electrical conduction through the body.

The flux guide provides inherent electrical isolation from the power supplying components in the flux guide induction heating device 50. The inherent isolation from the flux guide is obtained at no additional cost, compared to the typical coil-type induction heating system 20 which requires the intermediate transformer 42 to provide electrical isolation between the coil 22 and the power supplying components 36, 38 and 42 (FIG. 1).

Because the flux guide is capable of efficiently carrying the flux 76 considerable distances away from the winding(s), the electrical current-carrying and voltage-supporting components 82, 86 and 88 of the device 50 (FIG. 3) may be located in shielded areas away from the exposed gap and the workpiece. In this manner, greater safety is obtained by separating the electrical components from humans who may inadvertently contact those components.

The ability to provide transverse access into the gap of the flux guide, and/or to attach additional magnetic linkage pieces to the segments of the flux guide on opposite sides of the gap offers the capability to heat elongated and nonuniformly shaped workpieces without cutting the workpiece and without threading the workpiece through the flux guide.

Changing the number of turns of the coil around the flux guide has the effect of modifying the impedance into which the inverter 88 delivers the drive current 78 (FIG. 3). Because the drive current 78 is a high frequency signal, matching the impedance of the flux guide with that of the inverter 88 will result in delivering maximum power to the winding of the flux guide according to the frequency of the drive current 78. Different workpieces may require a change in the frequency of the drive current 78 and/or the use of a different inverter 88. Under such circumstances, the impedance of the flux guide can be changed to accommodate a different frequency or a different inverter by adjusting the number of turns of the conductor which forms the winding. This offers a considerable advantage over prior art coil-type induction heating systems, because to change the impedance in such prior art systems usually requires a change in configuration of the coil. Changing the coil configuration requires an extensive amount of labor and cost, as well as unproductive time when the prior art coil-type induction heating system cannot be used.

There is no possibility of melting the metal pieces by inadvertent contact of the workpiece with the flux guide, unlike the prior art coil 22 (FIG. 1). Inadvertently contacting the workpiece at different contact points on the prior art coil could create a short-circuit condition between those contact points through the workpiece. A very high current will flow through the short-circuited workpiece, and may melt, deform or damage the workpiece and/or the prior art coil along the short-circuit current path. Of course, a damaged or melted workpiece is wasted material needlessly expended in constructing manufactured products, and compensation for the waste must be obtained in the price of the other manufactured products. Electrically insulating the prior art coil is possible, but the electrical insulation further separates the coil from the metal pieces and thereby diminishes the amount of flux available to interact with the workpiece.

Because substantially all of the flux created by the winding is delivered to the workpiece, and because multiple turns of the conductor which form the winding are used to create the flux 76, a lesser amount of high frequency drive current 78 is required to create enough flux 76 to adequately heat the workpiece. The inverter 88 may therefore be of lesser capacity. Furthermore, the inverter 88 may also be more efficient in its energy conversion, because the efficiency of energy conversion is usually related to the magnitude of the high frequency drive current 78 created.

The lesser amount of high frequency drive current 78 makes it easier to control and regulate the drive current 78 supplied to the winding of the flux guide. More precise heating effects can be achieved by more precisely controlling the magnitude of the drive current 78. Consequently, it is easier and more precise to make smaller changes in the high frequency drive current 78 to create greater changes in the flux induced in the workpiece than it is to make more massive changes in an already large intermediate waveform 40 (FIG. 1). More precise temperature regulation is therefore possible.

The inverter 88 is capable of directly driving the winding of the flux guide without using an intermediate transformer 42

(FIG. 1). Eliminating the intermediate transformer eliminates one of the energy conversion steps, and therefore increases the overall system energy efficiency. More of the energy supplied to the flux guide induction heating device 50 is actually transferred into heat in the workpiece. The overall energy efficiency is increased considerably as a result of using the flux guide. Energy usage with the flux guide inductive heating device 50 is expected to be only about 50 percent or less of the amount of energy required to power a typical prior art coil-type induction heating system 20 (FIG. 1).

Because of the flux multiplying capabilities of the multi-turn winding and the considerably greater efficiency of the flux guide in directing the generated flux on to the workpiece, it is not necessary to use a larger capacity, more expensive rectifier 36 and inverter 38 which are typically required in the prior art coil-type induction heating system 20 (FIG. 1). Of course, the intermediate transformer 42 may be eliminated entirely. Both the acquisition and operating costs of the flux guide induction heating device 50 are substantially reduced, compared to those of a prior art coil-type induction heating system.

The reduced capacity and size of the components used in the flux guide induction heating device 50 reduces the amount of floor space required in the manufacturing facility to set up and use the heating device 50. Freeing up more available floor space in the manufacturing facility has the advantage of more effectively utilizing the manufacturing facility for additional productive purposes.

On the whole, it is expected that the use of the flux guide induction heating device 50 described above will result in approximately a 50 percent energy savings compared to the energy required by a coil type induction heating system 20 (FIG. 1). The energy savings are in addition to the expected reduction in acquisition costs, the increased efficiency of manufacturing products, the increased availability of space in the manufacturing facility for other productive uses, and the reduction in costs achieved by not distributing separate power supply conductors within the manufacturing facility.

For these and other reasons, the present invention represents a significant advancement in the field of induction heating of elongated and nonuniformly shaped workpieces. Even more improvements and benefits will be apparent upon fully comprehending the significance of the invention.

Presently preferred embodiments of the invention and many of its improvements have been described with a degree of particularity. The specificity of this description is of the preferred examples for implementing the invention. The specificity of description is not necessarily intended to limit the scope of the invention, because the scope of the invention is defined by the following claims.

The invention claimed:

1. A method of induction heating an elongated and electrically conductive workpiece, comprising:
   using two flux guides, each flux guide having a closed geometric configuration except at a gap which extends transversely across each flux guide,
   separating the two flux guides laterally with respect to one another at the gaps in each of the flux guides;
   using space between the two laterally separated flux guides as openings;
   conducting alternating magnetic flux in the flux guides;
   allowing the magnetic flux to flow from the flux guides through the gaps;
   extending the elongated workpiece within the openings on opposite sides of the gaps with a selected portion of the elongated workpiece extending in a direction aligned with the direction of flux flow across the gaps;
   allowing magnetic flux from the flux guides to flow from the openings into the elongated workpiece and through the selected portion of the workpiece at the gaps;
   establishing a difference in an amount of magnetic flux flowing through the selected portion of the workpiece at the gaps compared to an amount of magnetic flux flowing exterior of the selected portion of the workpiece at the gaps which is sufficient to induce eddy currents to flow circumferentially around the selected portion of the workpiece at the gaps to heat the selected portion; and
   maintaining the selected portion of the workpiece at the gaps for a predetermined amount of time sufficient for the circumferential eddy currents to heat the selected portion of the workpiece at the gaps.

2. A method as defined in claim 1, further comprising:
   creating alternating magnetic flux in the flux guides by conducting an alternating drive current through a multi-turn coil wound around the flux guides.

3. A method as defined in claim 2, further comprising:
   converting DC power directly into the alternating drive current applied to the multi-turn coil.

4. A method as defined in claim 3, further comprising:
   regulating the amount of alternating drive current applied to the multi-turn coil to control the temperature of the selected portion of the workpiece at the gaps.

5. A method as defined in claim 4, further comprising:
   converting commercial AC power into the DC power prior to converting the DC power directly into the alternating drive current; and
   electrically isolating the workpiece from the AC power, the DC power and the alternating drive current with the flux guides.

6. A method as defined in claim 3, further comprising:
   changing the number of turns of the multi-turn coil around the flux guides to adjust the impedance into which the drive current is delivered to match an inherent impedance of an inverter used to convert the DC power directly into the alternating drive current.

7. A method as defined in claim 3, further comprising:
   changing the number of turns of the multi-turn coil around the flux guides to adjust the impedance into which the drive current is delivered in accordance with a differing characteristics of the workpiece.

8. A method as defined in claim 1, wherein the elongated workpiece has a nonuniform portion separated by uniform portions on opposite longitudinal locations relative to the nonuniform portion, the method further comprising:
   placing the nonuniform portion at the gaps;
   placing the uniform portions in the openings;
   using the difference in the amount of flux flowing through the nonuniform portion compared to the amount of flux flowing exterior of the nonuniform portion at the gaps to induce eddy currents flowing circumferentially around the nonuniform portion of the workpiece at the gaps; and
   maintaining the nonuniform portion at the gaps for a predetermined amount of time sufficient for the circumferential eddy currents to heat the nonuniform portion.

9. A method as defined in claim 8, further comprising:
   rotating the nonuniform portion and the flux guides relative to one another while the eddy currents are induced in the nonuniform portion.

10. A method as defined in claim 1, further comprising:
    moving the workpiece longitudinally in the openings to move the selected portion of the workpiece at the gaps after the selected portion has been heated.

11. A method as defined in claim 1, further comprising:

separating the elongated workpiece from between the flux guides by transversely removing the elongated workpiece from the openings.

12. A method as defined in claim 1, further comprising:

transversely moving the elongated workpiece into the space between the two laterally separated flux guides.

13. A method as defined in claim 1, further comprising:

creating alternating magnetic flux in the flux guide by conducting a first alternating drive current having a first frequency through a coil wound around at least one of the flux guides while simultaneously conducting a second alternating drive current having a second different frequency through a different coil wound around at least one of the flux guides.

\* \* \* \* \*